(12) United States Patent
Knauff

(10) Patent No.: US 7,317,270 B2
(45) Date of Patent: Jan. 8, 2008

(54) ELECTRIC MACHINE WITH TRANSDUCER SYSTEM

(75) Inventor: Axel Knauff, Münnerstadt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/841,938

(22) Filed: May 7, 2004

(65) Prior Publication Data

US 2004/0251756 A1 Dec. 16, 2004

(30) Foreign Application Priority Data

May 8, 2003 (DE) ................ 103 20 613

(51) Int. Cl.
*H02K 7/10* (2006.01)
(52) U.S. Cl. .................. 310/75 R; 310/68 B
(58) Field of Classification Search ............. 310/75 R, 310/68 B, 90, 112, 89; 384/476
See application file for complete search history.

(56) References Cited

U.S. PATENT DOCUMENTS

| | | | | |
|---|---|---|---|---|
| 3,102,571 A | * | 9/1963 | Scott | 411/301 |
| 4,732,494 A | * | 3/1988 | Guers et al. | 384/448 |
| 5,517,067 A | * | 5/1996 | Sata | 310/68 B |
| 6,030,128 A | * | 2/2000 | Pontzer | 384/476 |
| 6,107,704 A | * | 8/2000 | Wallner et al. | 310/40 MM |
| 6,166,468 A | * | 12/2000 | Suzuki et al. | 310/90 |
| 6,559,633 B1 | * | 5/2003 | Nachtigal et al. | 324/174 |
| 6,595,693 B1 | * | 7/2003 | Message et al. | 384/448 |
| 6,674,192 B2 | * | 1/2004 | Morikaku et al. | 310/68 R |
| 6,803,685 B2 | * | 10/2004 | Ikawa et al. | 310/68 B |
| 6,841,993 B2 | * | 1/2005 | Iwamoto et al. | 324/207.25 |
| 2003/0086630 A1 | * | 5/2003 | Bramel et al. | 384/476 |
| 2004/0051419 A1 | * | 3/2004 | Frank et al. | 310/270 |
| 2004/0084445 A1 | * | 5/2004 | Weijer et al. | 219/679 |
| 2004/0095132 A1 | * | 5/2004 | Carlson et al. | 324/207.22 |
| 2004/0196027 A1 | * | 10/2004 | Iwamoto et al. | 324/207.21 |

FOREIGN PATENT DOCUMENTS

| | | | |
|---|---|---|---|
| DE | 17 83 806 | | 10/1958 |
| DE | 29920785 U1 | * | 1/2000 |
| DE | 100 06 223 A1 | | 8/2000 |
| DE | 199 56 959 A1 | | 6/2001 |
| DE | 200 07 714 U1 | | 10/2001 |
| JP | 2002276681 A | * | 9/2002 |
| WO | WO 0107922 A1 | * | 2/2001 |
| WO | WO 0250985 A1 | * | 6/2002 |

* cited by examiner

*Primary Examiner*—Dang Le
*Assistant Examiner*—Nguyen N. Hanh
(74) *Attorney, Agent, or Firm*—Henry M. Feiereisen; Ursula B. Day

(57) ABSTRACT

An electric machine includes a stator, a rotor, an electrically insulated bearing unit for supporting the rotor, a transducer system, and at least one torque support for connecting the transducer system to the rotor and the stator. In order to prevent a potential equalization between the stator and the rotor as a result of currents induced in the rotor, the transducer system is electrically decoupled from the rotor and/or stator.

22 Claims, 1 Drawing Sheet

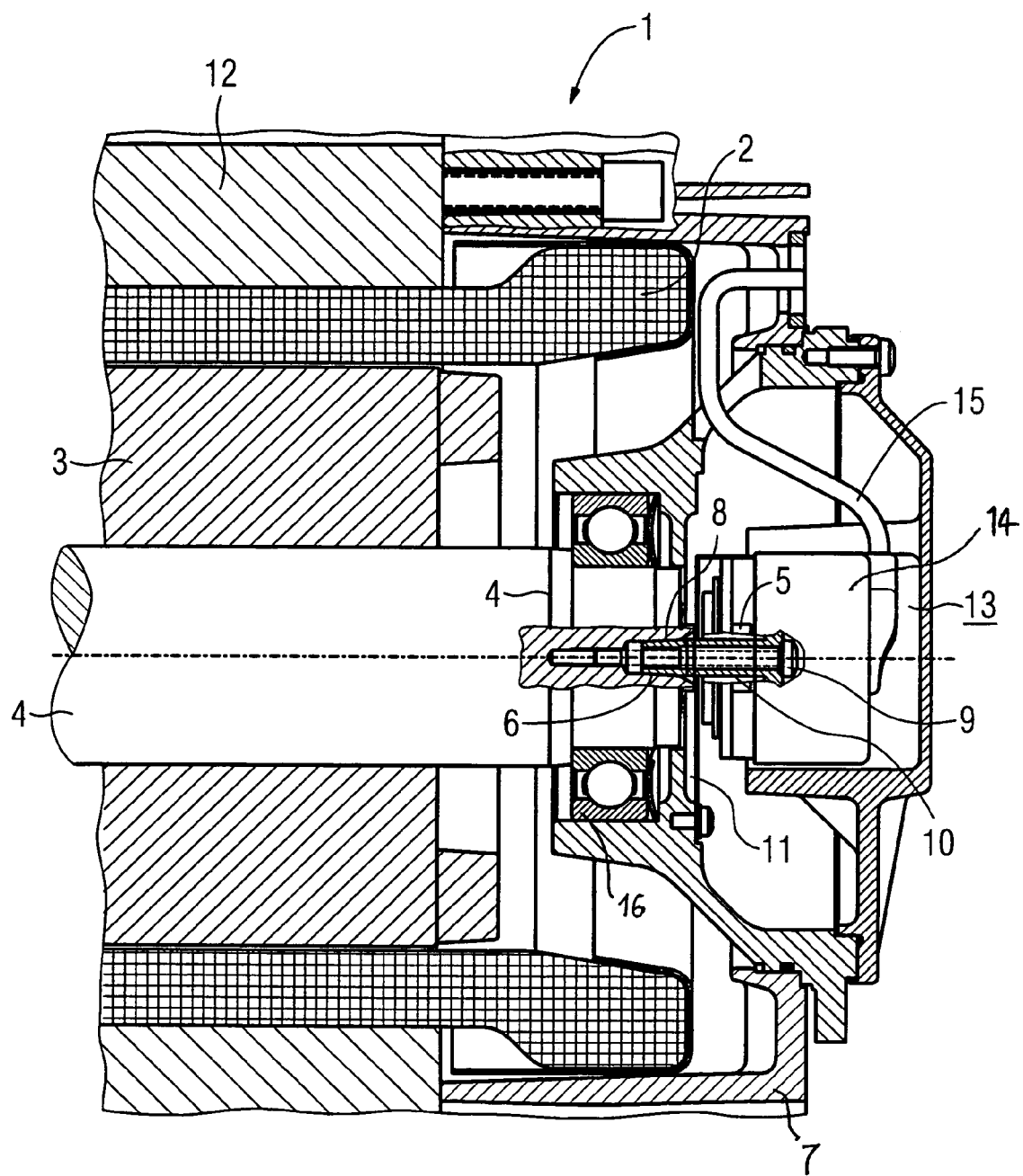

ELECTRIC MACHINE WITH TRANSDUCER SYSTEM

CROSS-REFERENCES TO RELATED APPLICATIONS

This application claims the priority of German Patent Application, Serial No. 103 20 613.2, filed May 8, 2003, pursuant to 35 U.S.C. 119(a)-(d), the disclosure of which is incorporated herein by reference.

BACKGROUND OF THE INVENTION

The present invention relates, in general, to an electric machine.

An electric machine of a type involved here includes a stator, a rotor, and a transducer system which is connected to the rotor and the stator via a torque support. Oftentimes, currents are encountered in electric machines which are induced in the rotor and cause a different electric potential between rotor and stator. Equalization of the potential takes hereby place via the ball bearing that supports the rotor. As a consequence, premature wear of the ball bearing occurs. One approach to prevent the formation of such bearing currents as caused by potential equalization involves the use of electrically insulated bearings in the electric machine. However, this merely shifts the potential equalization to the bearing unit for the transducer system, so that the bearing unit for the transducer system is ultimately destroyed prematurely.

To address this problem, it has been proposed to electrically insulate the bearing unit for the transducer system. This proposal is, however, very expensive so that its application is impractical, in particular when standard transducers are involved.

It would therefore be desirable and advantageous to provide an improved electric machine which obviates prior art shortcomings and which is so constructed as to prevent a potential equalization between rotor and stator via the bearing unit for the transducer system.

SUMMARY OF THE INVENTION

According to one aspect of the present invention, an electric machine includes a stator, a rotor, a transducer system, an electrically insulated bearing unit for supporting the transducer system in relation to the rotor, and at least one torque support for connecting the transducer system to the rotor and the stator, wherein the transducer system is electrically decoupled from the rotor and/or stator.

The present invention resolves prior art problems by electrically decoupling the transducer system from the rotor and/or the stator. The transducer system can hereby be decoupled by employing suitable measures. This is necessary, when the rotor includes an electrically insulated bearing unit and/or when disposing an insulating layer in the form of a lubricant film between rotor and bearing unit. In accordance with the invention, a potential equalization between rotor and stator across the bearing for the transducer system and a premature wear of the bearing caused by bearing currents is thus prevented.

There are various ways to decouple the transducer system from the rotor and/or stator. According to one option of the present invention, the torque support for establishing a rigid connection between the housing of the electric machine and the housing of the transducer system may be made of electrically non-conducting material. Examples of suitable non-conducting material may include plastic material, such as PA66, or composite material, such as GFK.

According to another feature of the present invention, the rotor has a driveshaft and the transducer system has a bushing which is received in the driveshaft for supporting the transducer system and which may be made of electrically non-conducting material, e.g. ceramic or plastic. As an alternative, it is also possible to coat a shaft portion of the driveshaft in an area of the transducer system with an electrically non-conducting coating for realizing a decoupling of rotor and stator.

According to another feature of the present invention, the transducer system may be connected to the driveshaft in an electrically insulating manner. For example, the connection may be realized by a screw fastener which is made of non-conducting material, or may be inserted in a bushing that is received in the driveshaft for supporting the transducer system, with the bushing being made of non-conducting material.

According to another feature of the present invention, the transducer system has a transducer shaft which may have at least a predetermined portion made of non-conducting material. It is also conceivable to coat the transducer shaft about its circumference with electrically non-conducting material.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a fragmentary longitudinal section of an electric machine according to the present invention in the area of a transducer system.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a fragmentary longitudinal section of an electric machine according to the present invention, generally designated by reference numeral 1 and including a rotor 3, which has a driveshaft 4, a stator 12, which has a winding 2, and a transducer system 13, which is attached at one end of the rotor 3. The electric machine 1 may hereby configured in the form of any conventional machine type, including asynchronous machine or synchronous machine, or any other type that uses a transducer system and/or requires prevention of a potential equalization between the rotor 3 and the stator 12. The transducer system 13 is provided, e.g. to detect the position of the rotor 3 relative to the stator 12, and includes a housing 14 and a transducer shaft 10 supported in the housing 14. The transducer system 13 is supported via a bearing 5 upon a bushing 8 which extends into the driveshaft 4 in coaxial disposition thereto and provided to receive a screw fastener 9. A torque support 11 is further provided to establish a rigid connection between the housing 7 of the electric machine 1 and the housing 14 of the transducer system 13. A bearing unit 16 seats in the torque support 11 for supporting the driveshaft 4 of the rotor 3.

In accordance with the present invention, the transducer system 13 is electrically decoupled from the driveshaft 4 in the area of the bearing 5 and thus protected against premature wear. The electric decoupling can hereby be realized by making the torque support 11 of electrically non-conducting material, such as plastic material, e.g. PA66, or a composite, e.g. GFK.

Decoupling between driveshaft 4 and bearing 5 of the transducer system 13 may also be realized by making the bushing 8 of electrically non-conducting material, e.g. ceramic or plastic. Another option involves coating a shaft portion of the driveshaft 4 in the connection zone 6 with a layer of electrically non-conducting material. The screw fastener 9 is hereby made electrically non-conducting, either by making the screw fastener 9 of electrically insulating material, or by making the bushing 8 of electrically non-conducting material.

Still another option of implementing an electric insulation and thus a decoupling of the transducer system 13 from the rotor 3 and/or stator 12 involves the manufacture of the transducer shaft 10 of electrically non-conducting material, or a coating of the transducer shaft 10 with electrically non-conducting material.

When the housing of the stator 12 and the housing 14 of the transducer system have a same potential, the cable shield for the transducer cable 15 may be attached on both sides thereof.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electric machine, comprising:
   a stator;
   a rotor;
   a transducer system electrically decoupled from at least one member selected from the group consisting of the rotor and the stator;
   an electrically insulated bearing unit for supporting the transducer system in relation to the rotor; and
   at least one torque support for connecting the transducer system to the rotor or the stator,
   wherein the rotor has a driveshaft, said bearing unit including a bushing received in the driveshaft for supporting the transducer system, said bushing being made of electrically non-conducting material.

2. The electric machine of claim 1, wherein the torque support is made of electrically non-conducting material.

3. The electric machine of claim 2, wherein the torque support is made of plastic material or composite material.

4. The electric machine of claim 3, wherein the torque support is made of PA66.

5. The electric machine of claim 3, wherein the torque support is made of fiber reinforced plastics.

6. The electric machine of claim 1, wherein the bushing is made of ceramic or plastic.

7. An electric machine, comprising:
   a stator;
   a rotor;
   a transducer system electrically decoupled from at least one member selected from the group consisting of the rotor and the stator;
   an electrically insulated bearing unit for supporting the transducer system in relation to the rotor; and
   at least one torque support for connecting the transducer system to the rotor or the stator,
   wherein the rotor has a driveshaft having a shaft portion in an area of the transducer system, said shaft portion being coated with an electrically non-conducting coating.

8. The electric machine of claim 7, wherein the torque support is made of electrically non-conducting material.

9. The electric machine of claim 8, wherein the torque support is made of plastic material or composite material.

10. The electric machine of claim 9, wherein the torque support is made of PA66.

11. The electric machine of claim 9, wherein the torque support is made of fiber reinforced plastics.

12. An electric machine, comprising:
    a stator;
    a rotor having a driveshaft;
    a transducer system electrically decoupled from at least one member selected from the group consisting of the rotor and the stator;
    an electrically insulated bearing unit for supporting the transducer system in relation to the rotor;
    at least one torque support for connecting the transducer system to the rotor or the stator, and
    a fastening assembly for connecting the transducer system to the driveshaft in an electrically insulating manner, wherein the fastening assembly includes a screw fastener and a bushing received in the driveshaft for supporting the transducer system and constructed for receiving the screw fastener, said bushing being made of non-conducting material.

13. The electric machine of claim 12, wherein the fastening assembly includes a screw fastener made of non-conducting material.

14. The electric machine of claim 12, wherein the torque support is made of electrically non-conducting material.

15. The electric machine of claim 14, wherein the torque support is made of plastic material or composite material.

16. The electric machine of claim 15, wherein the torque support is made of PA66.

17. The electric machine of claim 15, wherein the torque support is made of fiber reinforced plastics.

18. An electric machine, comprising:
    a housing;
    a stator attached to the housing;
    a rotor interacting with the stator and having a driveshaft;
    a transducer system electrically decoupled from at least one member selected from the group consisting of the rotor and the stator;
    an electrically insulated bearing unit for supporting the transducer system in relation to the rotor; and
    at least one torque support supporting the transducer system and connecting the transducer system to the housing,
    wherein the transducer system has a transducer housing and a transducer shaft made of a non-conducting material, and wherein the non-conducting transducer shaft extends from within the transducer housing to be directly received in the driveshaft.

19. The electric machine of claim 18, wherein the torque support is made of electrically non-conducting material.

20. The electric machine of claim 19, wherein the torque support is made of plastic material or composite material.

21. The electric machine of claim 20, wherein the torque support is made of PA66.

22. The electric machine of claim 20, wherein the torque support is made of fiber reinforced plastics.

* * * * *